United States Patent
Chang et al.

(10) Patent No.: US 9,423,115 B2
(45) Date of Patent: Aug. 23, 2016

(54) LIGHTING DEVICE WITH MICROWAVE DETECTION FUNCTION

(71) Applicant: U&U ENGINEERING INC, Taipei (TW)

(72) Inventors: Chi-Ho Chang, Taipei (TW); Yun-Chun Sung, Taipei (TW); Ming-Tsung Hsu, Taipei (TW); Jen-Chih Huang, Taipei (TW); Guo-Zhong Lu, Taipei (TW); Ping-Chang Tsao, Taipei (TW)

(73) Assignee: U&U ENGINEERING INC., Taipei (TW)

( * ) Notice: Subject to any disclaimer, the term of this patent is extended or adjusted under 35 U.S.C. 154(b) by 353 days.

(21) Appl. No.: 14/095,763

(22) Filed: Dec. 3, 2013

(65) Prior Publication Data

US 2015/0070205 A1  Mar. 12, 2015

(30) Foreign Application Priority Data

Sep. 6, 2013  (TW) ............................. 102132290 A

(51) Int. Cl.
*G01S 13/58* (2006.01)
*F21V 23/04* (2006.01)
*G01S 7/03* (2006.01)
*G01S 7/35* (2006.01)
*G01S 13/56* (2006.01)
(Continued)

(52) U.S. Cl.
CPC .............. *F21V 23/0471* (2013.01); *F21K 9/13* (2013.01); *F21V 23/045* (2013.01); *G01S 7/03* (2013.01); *G01S 7/35* (2013.01); *G01S 13/56* (2013.01); *G01S 13/345* (2013.01); *G01S 13/584* (2013.01)

(58) Field of Classification Search
CPC .. F21V 23/0471; F21V 23/045; G01S 13/345
USPC .................... 342/94, 110, 118, 200, 109, 128
See application file for complete search history.

(56) References Cited

U.S. PATENT DOCUMENTS

| | | | | |
|---|---|---|---|---|
| 4,528,566 A | * | 7/1985 | Tyler | ........................ G01S 1/685 342/419 |
| 5,867,099 A | * | 2/1999 | Keeter | ................ F21V 23/0442 340/565 |

(Continued)

FOREIGN PATENT DOCUMENTS

| | | |
|---|---|---|
| CN | 102830395 A | 12/2012 |
| CN | 202691675 U | 1/2013 |

(Continued)

*Primary Examiner* — Jack W Keith
*Assistant Examiner* — Marcus Windrich
(74) *Attorney, Agent, or Firm* — Hauptman Ham, LLP

(57) ABSTRACT

A lighting device includes a microwave sensor for adjusting its sensing range based on a range gate selected from multiple range gates. An active antenna module transmits first FMCW signal toward a target based on the selected range gate and for receiving second FMCW signal reflected from the target. The microwave sensor demodulates the first FMCW signal and the second FMCW signal to generate beat frequency signal. Then another demodulator demodulates the beat frequency signal to generate Doppler signal. The microwave sensor calculates a range between the microwave sensor and the target based on the beat frequency signal, calculates velocity of the target according to frequency of the Doppler signal, and determine whether to generate triggering signal according to the calculated velocity and the calculated range, when the object located within the range gate. The power module enables a lamp based on the triggering signal.

12 Claims, 9 Drawing Sheets

(51) Int. Cl.
*F21K 99/00* (2016.01)
*G01S 13/34* (2006.01)

(56) References Cited

U.S. PATENT DOCUMENTS

| | | | | |
|---|---|---|---|---|
| 6,069,561 | A * | 5/2000 | Schopf | G01S 13/56 |
| | | | | 315/159 |
| 9,228,731 | B2 * | 1/2016 | Chen | H04N 7/183 |
| 2009/0219191 | A1 * | 9/2009 | Natsume | B60Q 1/0023 |
| | | | | 342/109 |
| 2011/0084872 | A1 * | 4/2011 | Kishida | G01S 3/48 |
| | | | | 342/146 |
| 2011/0121654 | A1 * | 5/2011 | Recker | H04B 37/0272 |
| | | | | 307/66 |
| 2012/0153823 | A1 * | 6/2012 | Lee | F21V 23/0471 |
| | | | | 315/32 |
| 2013/0207546 | A1 * | 8/2013 | Chen | H04B 37/0218 |
| | | | | 315/112 |
| 2013/0207547 | A1 | 8/2013 | Chen | |
| 2015/0123546 | A1 * | 5/2015 | Pandharipande | H04B 37/0227 |
| | | | | 315/153 |

FOREIGN PATENT DOCUMENTS

| | | |
|---|---|---|
| TW | 515107 B | 12/2002 |
| TW | M395095 U | 12/2010 |
| TW | M435130 U | 8/2012 |
| TW | I390149 B | 3/2013 |

\* cited by examiner

LIGHTING DEVICE WITH MICROWAVE DETECTION FUNCTION

CROSS REFERENCE TO RELATED APPLICATION

This application claims priority to Taiwan Application Serial Number 102132290, filed on Sep. 6, 2013, which are herein incorporated by reference.

BACKGROUND OF THE INVENTION

1. Field of the Invention

The present invention relates to a lighting device, and more particularly, to a lighting device has a microwave detection function for sensing range and velocity of a moving target.

2. Description of the Prior Art

According to modern intelligent smart homecare and energy-saving requirements, a switch of a lamp or strength of illumination of a lamp in most of lighting devices is designed with a power-saving and energy-saving structure. A common low-power miniature sensor is divided into two types—an infrared sensor and a microwave sensor. The infrared sensor is an electronic device which senses a moving object. The infrared sensor senses movement of the object with variation of infrared ray emitted by a human being. The microwave sensor calculates velocity of the moving object by measuring the Doppler signal of the moving object.

But, restricted to the size of the sensor and the direction of beams, the sensor usually hangs outside of the lamp so that a single chip and a switch-option switch can control switching and brightness of a lamp by choosing a switch. When a person enters the sensing range of the infrared sensor externally connected to the lamp, the infrared sensor is triggered to transmit a signal to activate the controller to illuminate.

However, it is necessary to take an indoor layout and an external controller into consideration when the sensor and the controller having functions of power-saving and energy-saving are used in the lamp system. The lamp system used in a house, a school, and an office building is hard to be maintained by an ordinary person. And, power consumption of the lamp system is larger than that of a single lamp.

In addition, it is harder to add an omnidirectional detection function to the infrared sensor and the 2.4 GHz microwave sensor because beam-width of the infrared sensor and the 2.4 GHz microwave sensor is narrower though smaller in size. Some infrared sensors are designed with secondary optics for increasing a detection angle. Decrease in transmitting signal frequency of the microwave sensor increases the beam-width of the antenna field, but the size of the microwave sensor increases as well. Provided that the design of the antenna is altered without changing the transmitting signal frequency, the detection angle may increase with generating side-lobe of the antenna field and a blind angle in detection. So, it is difficult to integrate the sensor and the lamp system into a single module.

SUMMARY OF THE INVENTION

According to the present invention, a lighting device comprises a light source for generating light, a microwave sensor, and a power module. The microwave sensor comprises: an active antenna module, for transmitting a first frequency modulation continuous wave (FMCW) signal toward a target with a sweep period and for receiving a second FMCW signal reflected from the target; a modulation module, electrically connected to the active antenna module and used for generating a modulation signal provided to the active antenna module according to a range gate chosen from a plurality of range gates, a bandwidth of the first FMCW signal being modulated according to amplitude of the modulation signal, and the plurality of range gates bi-uniquely corresponding to bandwidths of a plurality of first FMCW signals; a discrimination control module, electrically connected to the modulation module, for calculating a range between the microwave sensor and the target based on the beat frequency signal generated after the first FMCW signal and the second FMCW signal are demodulated when the object is located within the range gate, for calculating velocity of the target according to a frequency of the Doppler signal, and for determining whether to generate a triggering signal or not according to the calculated velocity and the calculated range.

The power module electrically connected between the microwave sensor and the light source for enabling a lamp based on the triggering signal.

In one aspect of the present invention, the active antenna module comprises a loop antenna and a radio frequency (RF) transistor. The loop antenna comprises a transmitting terminal and a receiving terminal, the transmitting terminal is used for transmitting the first FMCW signal, and the receiving terminal is used for transmitting the second FMCW signal. The radio frequency transistor comprises a control port, a first port and a second port, the second port coupled to the transmitting terminal, the control port coupled to the receiving terminal, and the control port being the reverse of the second port.

In another aspect of the present invention, the microwave sensor further comprises: a first low pass filter, electrically connected to the first port of the RF transistor, the first low pass filter and the RF transistor forming a first demodulator, the first demodulator being used for demodulating the beat frequency signal based on a range gate, and the beat frequency signal comprising a frequency difference of the first FMCW signal and the second FMCW signal; and a second demodulator, electrically connected to the first demodulator, for demodulating the beat frequency signal for generating the Doppler signal, the frequency of the Doppler signal being equal to a frequency difference of an up-sweep beat frequency and a down-sweep beat frequency.

In another aspect of the present invention, the second demodulator comprises: an AM Peak envelope sensor, electrically connected to the first low pass filter; and a second low pass filter, electrically connected to the AM Peak envelope sensor, and used for outputting the Doppler signal.

In another aspect of the present invention, the RF transistor is a bipolar junction transistor (BJT), the control port is a base, the first port is an emitter, and the second port is a collector.

In another aspect of the present invention, the radio frequency transistor is a field effect transistor, the field effect transistor comprises a pseudo high electron mobility transistor, the control port is a gate, the first port is a source, and the second port is a drain.

In another aspect of the present invention, the microwave sensor further comprises a first capacitor, two ends of the first capacitor are connected to the first port and the second port of the radio frequency transistor. The loop antenna comprises: a first inductor coupled to the second port of the radio frequency transistor; a second inductor; a third inductor coupled to the control port of the radio frequency transistor; a second capacitor coupled between the first inductor and the second inductor; and a third capacitor coupled between the second indictor and the third inductor.

In another aspect of the present invention, the discrimination control module comprises a range calculation unit electrically connected to the first port of the RF transistor and used for calculating a range between the microwave sensor and the target according to a first relation, the first relation is R=($f_b$× c×T)/(2×B), R indicates the range between the microwave sensor and the target, $f_b$ indicates beat frequency signal, B indicates scanning bandwidth, c indicates speed of light, and T indicates sweep period.

In another aspect of the present invention, the active antenna module comprises a substrate comprising a first surface and a second surface, and the first surface is opposite to the second surface; a first metallic antenna microstrip, disposed on the first surface of the substrate; a second metallic antenna microstrip, disposed on the first surface of the substrate; a third metallic antenna microstrip, disposed on the first surface of the substrate; a first coupling metallic sheet, disposed on the second surface of the substrate; second coupling metallic sheet, disposed on the second surface; and a third coupling metallic sheet, disposed on the second surface. The RF transistor is disposed on the first surface. The control port of the RF transistor is connected to the third metallic antenna microstrip, and the first port and the second port being are connected to the first coupling metallic sheet and the first metallic antenna microstrip, respectively. A first portion of the first metallic antenna microstrip and the first coupling metallic sheet form a first capacitor. A second portion of the first metallic antenna microstrip, a first portion of the second metallic antenna microstrip adjoin the first portion of the first metallic antenna microstrip, and the second coupling metallic sheet form a third capacitor, and a second portion of the second metallic antenna microstrip, a second portion of the third metallic antenna microstrip adjoin the second portion of the second metallic antenna microstrip, and the third coupling metallic sheet form a third capacitor.

In another aspect of the present invention, the active antenna module transmits the first FMCW signal, a direction of the first FMCW signal forms an angle with a moving direction of the target, and the discrimination control module is used for calculating the velocity of the moving target according to the angle, the speed of light, and the center frequency of a carrier wave of the first FMCW signal.

In another aspect of the present invention, the discrimination control module comprises a velocity calculation unit used for calculating the velocity of the moving target according to a second relation, the second relation is v=($f_b^-$−$f_b^+$)× c/(2×$f_c$×cos θ), v indicates velocity of the moving target, $f_b^-$ indicates down-sweep beat frequency, $f_b^+$ indicates up-sweep beat frequency, c indicates speed of light, and $f_c$ indicates center frequency of the carrier wave.

In another aspect of the present invention, the modulation module comprises a digital to analog interface of a digital signal processor and the digital to analog interface of the digital signal processor synthesizes the modulation signal.

In still another aspect of the present invention, the modulation module comprises an adder having an operational amplifier, the adder comprises a plurality of input terminals and an output terminal, each of the plurality of input terminals and an input positive terminal of the operational amplifier are coupled to different resistors, when one input terminal is connected to ground, the other input terminals are floating for outputting the different modulation signals with different amplitudes.

In yet another aspect of the present invention, the lighting device also comprises a lamp body, and the microwave sensor, the light source, and the power module are accommodated in the lamp body.

Compared with the conventional technology, an oscillator of a radio frequency (RF) module, a mixture tube, and an antenna are integrated into one entity in the present invention. So the microwave sensor is simplified and downsized. In this way, the microwave sensor, the light source, and the power module can be integrated into the lamp. Thus, the microwave sensor and the light source can use common alternative power without other externally connected controlling circuits and wires. It is unnecessary to use any domestic layout or any controlling circuit of a lamp. The higher the frequency of the conventional infrared sensor and the conventional 2.4 GHz microwave sensor, the narrower the 3 dB beam-width of the radiation field while the conventional infrared sensor and the 2.4 GHz microwave sensor sense a radiator during a frequency band of microwave and light wave. A side-lobe may be generated at certain angles, resulting in a blind angle in measurement if an omnidirectional field pattern is achieved in a design of array or antenna adjustment. Compared with the conventional infrared sensor and the conventional 2.4 GHz microwave sensor, the radiation field of the microwave sensor used in the lighting device in the present invention is almost omnidirectional without a blind angle in measurement. With the microwave sensor, the lighting device of the present invention can sense the target in a short distance but at a large angle. A first demodulator of the microwave sensor of the present invention equipped with a transistor and a low pass filter replaces a mixture tube. At the first stage, the first demodulator of the microwave sensor lowers and demodulates frequency for obtaining information on the calculated range. At the second stage, a second demodulator of the microwave sensor lowers and demodulates frequency for obtaining information on the calculated velocity. The microwave sensor of the present invention directly and quickly calculates the range and velocity and obtains the information on the calculated the range and velocity from a circuit hardware, so the design of a digital signal processor of the conventional microwave sensor can be greatly simplified. Moreover, the amplitude of a modulation signal generated by a modulation signal generator is altered to adjust an RF bandwidth of the FMCW (frequency modulation continuous wave) signals for controlling different detection ranges. A plurality of detection ranges are set in the present invention. The target is sensed only in the set detection ranges, so each of the set detection ranges is obviously defined.

These and other features, aspects and advantages of the present disclosure will become understood with reference to the following description, appended claims and accompanying figures.

DETAILED DESCRIPTION OF THE PREFERRED EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 1:
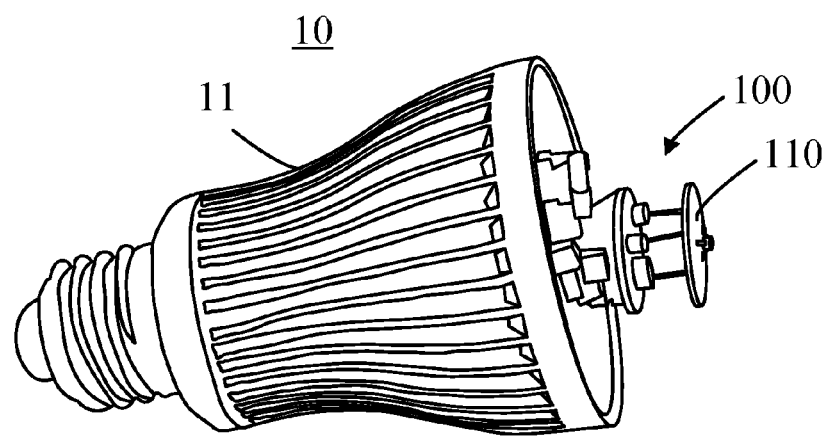
FIG. 1 illustrates a lighting device according to an embodiment of the present invention.
Figure 2:
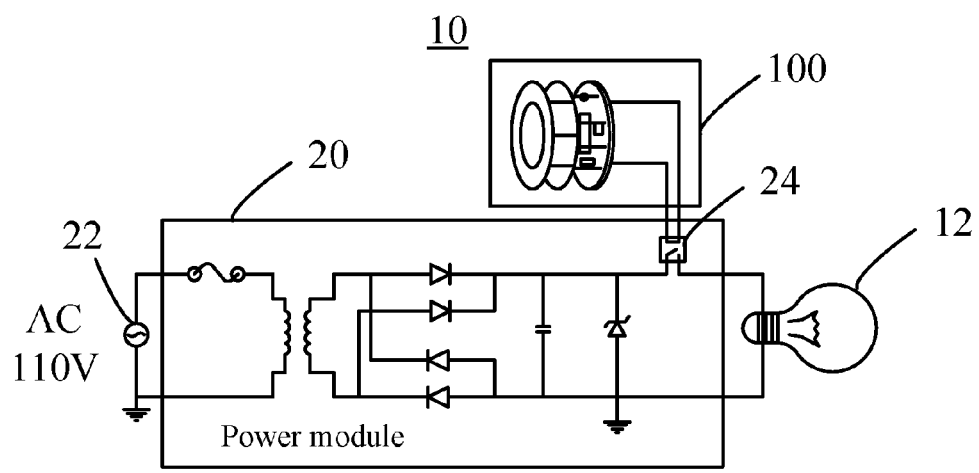
FIG. 2 is a functional block diagram showing the lighting device.

Please refer to FIG. 1 and FIG. 2. FIG. 1 illustrates a lighting device 10 according to an embodiment of the present invention. FIG. 2 is a functional block diagram showing the lighting device 10. The lighting device 10 comprises a lamp body 11, a light source 12, a microwave sensor 100, and a power module 20. The light source 12 may be a light emitting diode (LED). The microwave sensor 100 integrates a conventional active antenna and a conventional radio frequency (RF) module for calculating a range between the microwave sensor 100 and the target, for calculating velocity of the target when the target is located, and for determining whether to generate a triggering signal according to the calculated velocity and the calculated range when the object is located within a detection range (i.e., range gate). The power module 20 is electrically connected between the microwave sensor 100 and the light source 12 for converting an alternating current power supply 22 (e.g., commercial alternative power) to a direct current (DC) power. The power module 20 comprises an enabling unit 24 for conducting after receiving the triggering signal so that the power module 20 can provide the converted direct power to the light source 12. Then the light source 12 can emit light. The lamp body 11 accommodates the light source 12, the microwave sensor 100, and the power module 20. The microwave sensor 100 can be plugged in and out of the lamp body 11.

Figure 3:
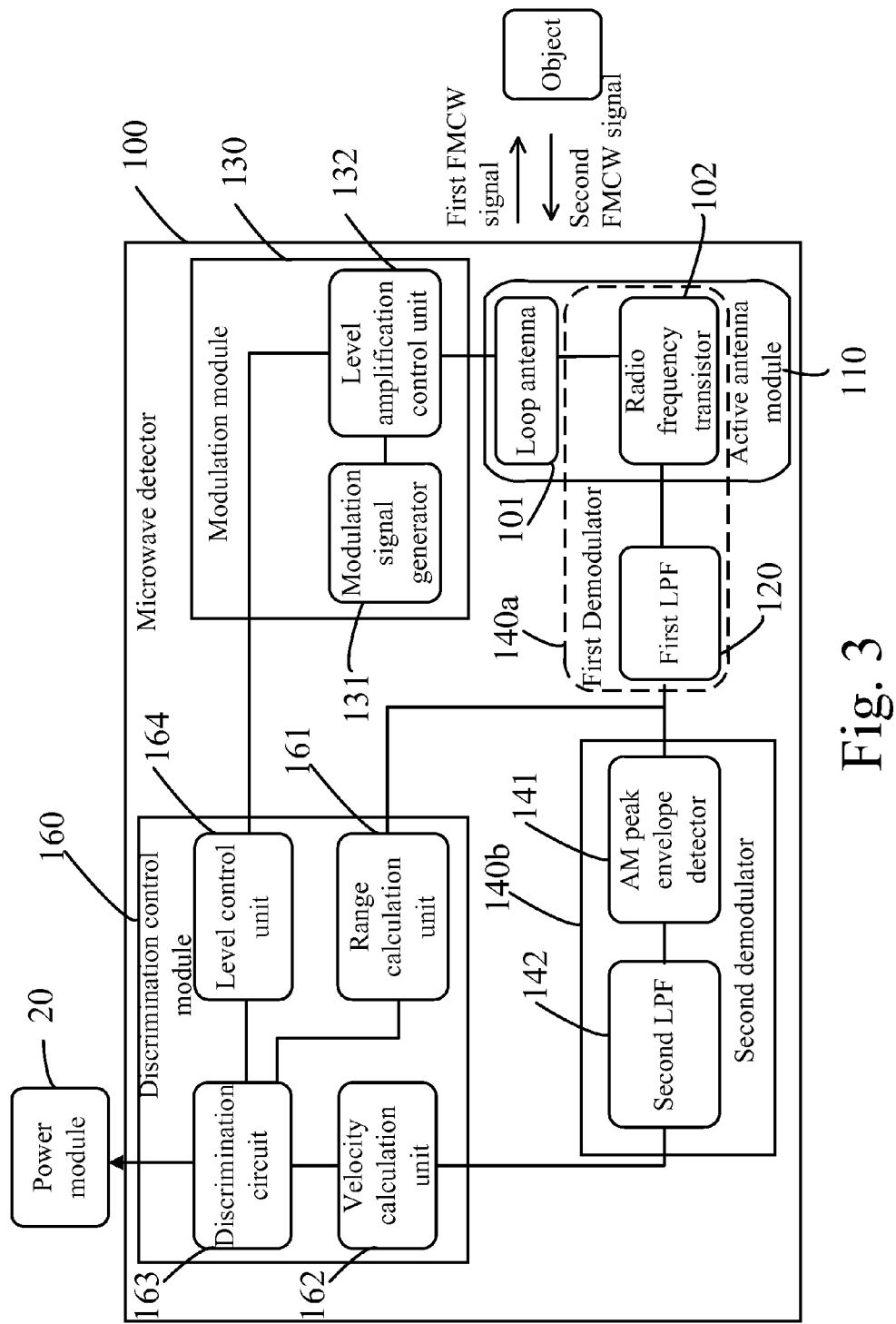
FIG. 3 is a schematic diagram showing a functional block diagram of a microwave sensor according to the present invention.

Please refer to FIG. 3, FIG. 3 is a schematic diagram showing a functional block diagram of a microwave sensor 100 according to the present invention. The microwave antenna 100 comprises an active antenna module 110, a first low pass filter 120, a modulation module 130, a second demodulator 140b, a discrimination control module 160, and a enabling unit 170. The active antenna module 110 integrates both the functions of antenna and radio frequency module. The active antenna module 110 comprises a loop antenna 101 and a radio frequency transistor 102. The loop antenna 101 transmits a first frequency modulation continuous wave (FMCW) signal towards an object and receives a second FMCW signal reflected back from the object. The first low pass filter 120 and the radio frequency transistor 102 form a first demodulator 140a. The first demodulator 140a is utilized for demodulating the first FMCW signal and the second FMCW signal to generate a beat signal based on a range gate, and the beat signal has a frequency equal to the difference between frequencies of the first FMCW signal and the second FMCW signal. The second demodulator 140b is utilized for demodulating the beat signal to generate a Doppler signal. A frequency of the Doppler signal is equal to the difference between an up-sweep beat frequency and a down-sweep beat frequency. The modulation module 130 is electrically connected to the active antenna module 110 and is utilized for generating a modulation signal to the active antenna module 110 based on one range gate selected from a plurality of range gates. A bandwidth of the first FMCW signal is adjusted according to an amplitude of the modulation signal. Each of the plurality of range gates is corresponding to one of the bandwidths of the first FMCW signal. The discrimination control module 160 is electrically connected to the modulation module 130 and is utilized for bypassing the calculation for the object if it is located outside the range gate. The discrimination control module 160 is also utilized for calculating a range between the microwave sensor 100 and the object based on the beat signal, and calculating a moving velocity of the object based on the frequency of the Doppler signal, when it is located inside the range gate, and determining whether to generate a trigger signal based on the calculated velocity and range. The enabling unit 170 then decides whether to activate another control, such as issuing an alert, flashing, etc., based on the trigger signal. The modulation module 130 is utilized for generating the modulation signal having varied amplitude based on the different detection ranges. The structure and operation of each component are elaborated in detail as follows.

Figure 4:
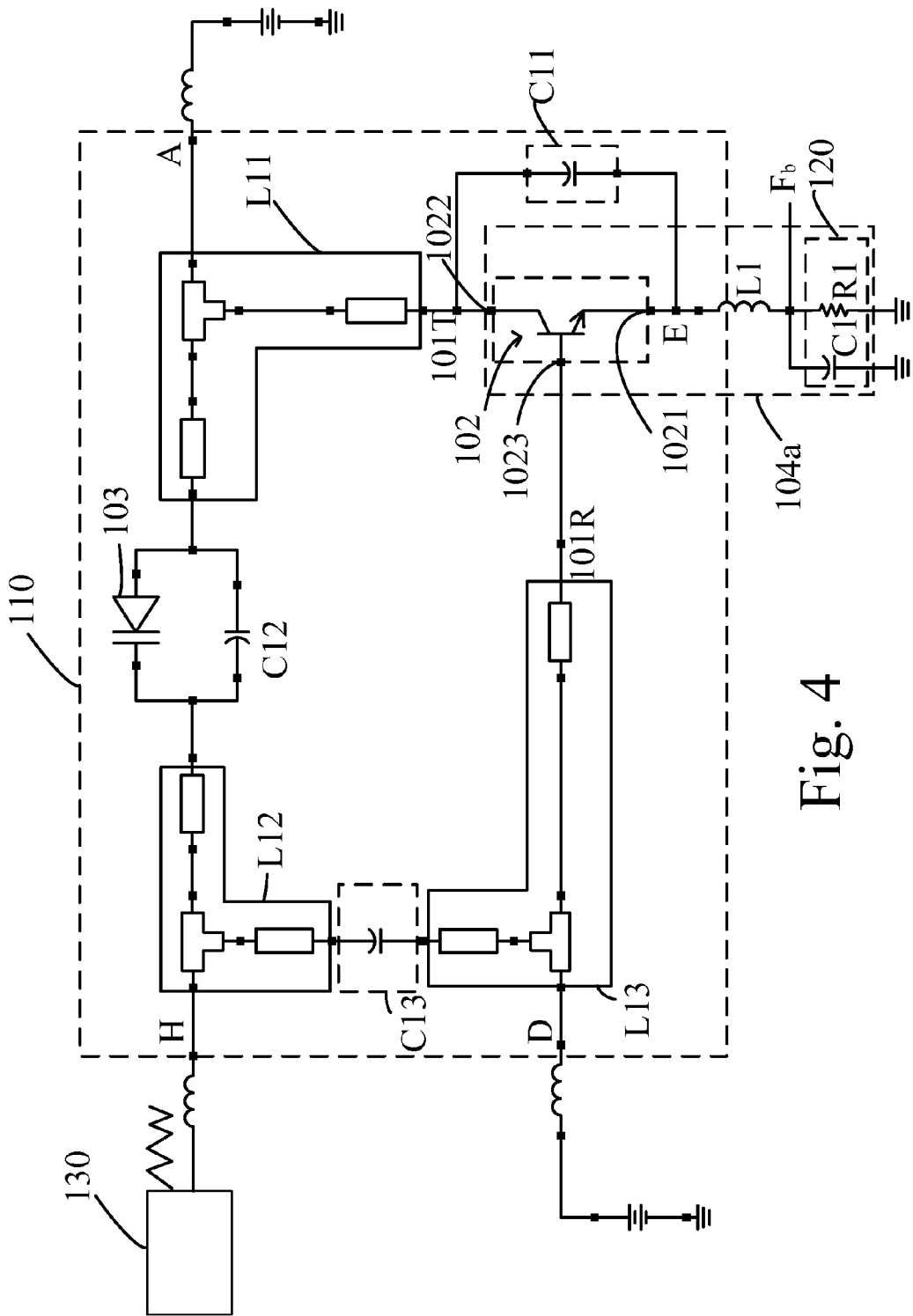
FIG. 4 is an equivalent circuit of the active antenna module in FIG. 3.

Please refer to FIG. 4, FIG. 4 is an equivalent circuit of the active antenna module in FIG. 3. The active antenna module 110, having a self-mixing and self-demodulation architecture, comprises the loop antenna 101 and the radio frequency transistor 102. The loop antenna 101 has a transmitting terminal 101T and a receiving terminal 101R. The transmitting terminal 101T is utilized for transmitting the first FMCW signal, and the receiving terminal 101R is utilized for transmitting the second FMCW signal. The loop antenna 101 comprises a first inductor L11, a second inductor L12, a third inductor L13, a first capacitor C12, a second capacitor C13, a third capacitor C13, and a varactor 103. The radio frequency transistor 102 has a control port 1023, a first port 1021, and a second port 1022. The second port 1022 is coupled to the transmitting terminal 101T, and the control port 1023 is coupled to the receiving terminal 101R. The first port 1021 and the second port 1022 are connected to two ends of the first capacitor C12. The first port 1021 is electrically connected to the first low pass filter 120 and is used as the output terminal for an intermediate frequency (baseband) demodulation signal. The varactor 103 and the second capacitor C13 are connected in parallel.

It is worth noticing that, in FIG. 4, there must be a 180-degree phase difference between the transmitting terminal 101T and the receiving terminal 101R to form a positive feedback circuit so as to obtain good oscillation. In the figure, the radio frequency transistor 102 is represented by a bipolar junction transistor (BJT). Actually, the radio frequency transistor 102 may be a field effect transistor (FET). Under the circumstances of FET, the radio frequency transistor 102 may be a pseudo high electron mobility transistor (P-Hemt). When the radio frequency transistor 102 is a BJT, the control port 1023 is a base electrode. The first port 1021, namely the port for down conversion, is an emitting electrode, and the second port 1022 is a collector electrode. When the radio frequency transistor 102 is a FET, the control port 1023 is a gate electrode. The first port 1021, namely the port for down conversion, is a source electrode, and the second port 1022 is a drain electrode.

Figure 5:
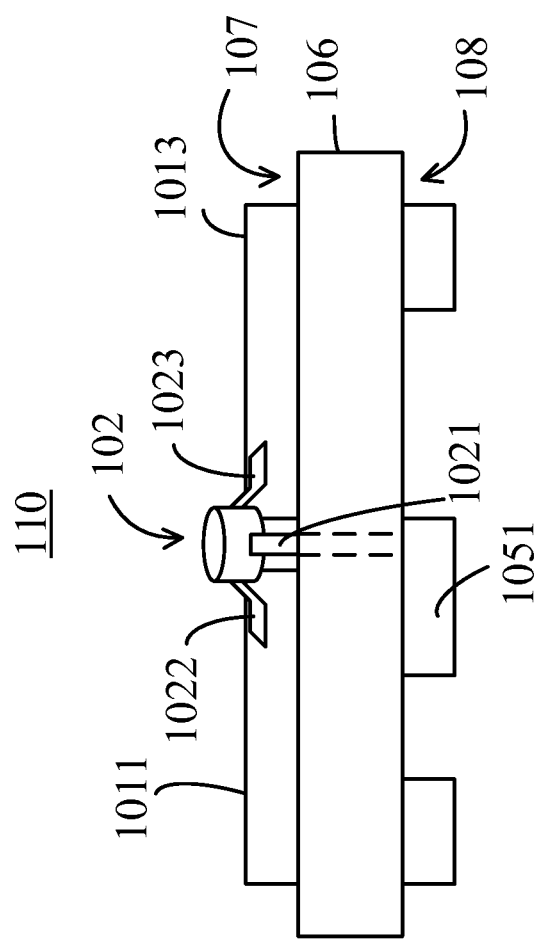
FIG. 5 is a transverse cross-sectional view of a structure of the active antenna module according to the present invention.
Figure 6:
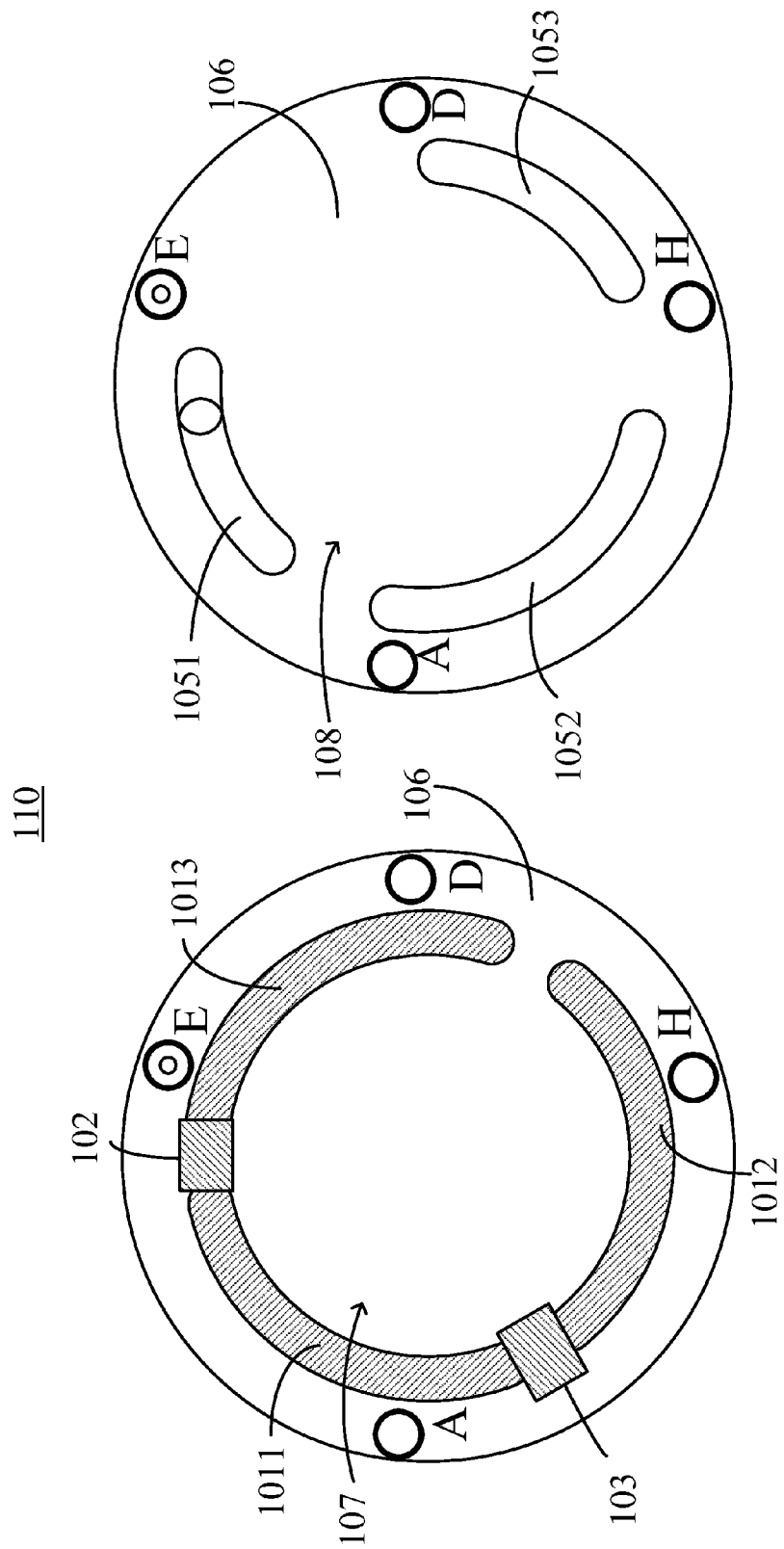
FIG. 6 shows structures on a front side and a back side of the active antenna module in FIG. 5.

Please refer to FIG. 5 and FIG. 6, FIG. 5 is a transverse cross-sectional view of a structure of the active antenna module according to the present invention. FIG. 6 shows structures on a front side and a back side of the active antenna module in FIG. 5. The active antenna module 100 comprises a first metal microstrip antenna 1011, a second metal microstrip antenna 1012, a third metal microstrip antenna 1013, a substrate 106, a radio frequency transistor 102, a first coupling metal sheet 1051, a second coupling metal sheet 1052, and a third coupling metal sheet 1053. The first metal microstrip antenna 1011, the second metal microstrip antenna 1012, and the third metal microstrip antenna 1013 are disposed on a first surface 107 (that is the front side) of the substrate 106. The first coupling metal sheet 1051, the second coupling metal sheet 1052, and the third coupling metal sheet 1053 are disposed on a second surface 108 (that is the back side) of the substrate 106. The first surface 107 and the second surface 108 are opposite faces of the substrate 106. The first metal microstrip antenna 1011, the second metal microstrip antenna 1012, the third metal microstrip antenna 1013, the substrate 106, the first coupling metal sheet 1051, the second coupling metal sheet 1052, and the third coupling metal sheet 1053 constitute the loop antenna 101 shown in FIG. 3. The first metal microstrip antenna 1011, the second metal microstrip antenna 1012, the third metal microstrip antenna 1013, the first coupling metal sheet 1051, the second coupling metal sheet 1052, and the third coupling metal sheet 1053 may be made of copper foils. The first port 1021, the second port 1022, and the control port 1023 of the radio frequency transistor 102 are respectively connected to the first coupling metal sheet 1051, the first metal microstrip antenna 1011, and the third metal microstrip antenna 1013. The first port 1021 is a port for down conversion that is used as the output terminal for the intermediate frequency (baseband) demodulation signal. Through hole A, through hole H, through hole D, and through hole E all penetrate through the substrate 106, and conducting paths are formed by adhering copper foils on the through holes. The through hole A is connected to the first metal microstrip antenna 1011 and is an input terminal of an antenna power signal. That means, the antenna power signal is input from the first metal microstrip antenna 1011 (equivalent to the first inductor L11 shown in FIG. 4). The through hole H is connected to the second metal microstrip antenna 1012 and is an input terminal for the modulation signal. That means, the through hole H is coupled to the modulation module 130 so that the modulation signal is input from the second metal microstrip antenna 1012 (equivalent to the second inductor L12 shown in FIG. 4), and the modulation signal is a triangular wave or a sine wave. The through hole D is connected to the third metal microstrip antenna 1013 and is an input terminal for a bias voltage for the radio frequency transistor 102. When the radio frequency transistor 102 is a FET, the through hole D may be connected to a fixed voltage (may be a ground terminal). The through hole E is connected to the first coupling metal sheet 1051.

The active antenna module 100 further comprises the varactor 103 disposed on the first surface 107. Two ends of the varactor 103 are connected to the first metal microstrip antenna 1011 and the second metal microstrip antenna 1012. The capacitance value of the varactor 103 will change in accordance with the voltage applied across the two ends. The varactor 103 is used for tuning a FM signal when the active antenna module 100 is applied to the FM tuner or the FM modulation circuit.

Figure 7:
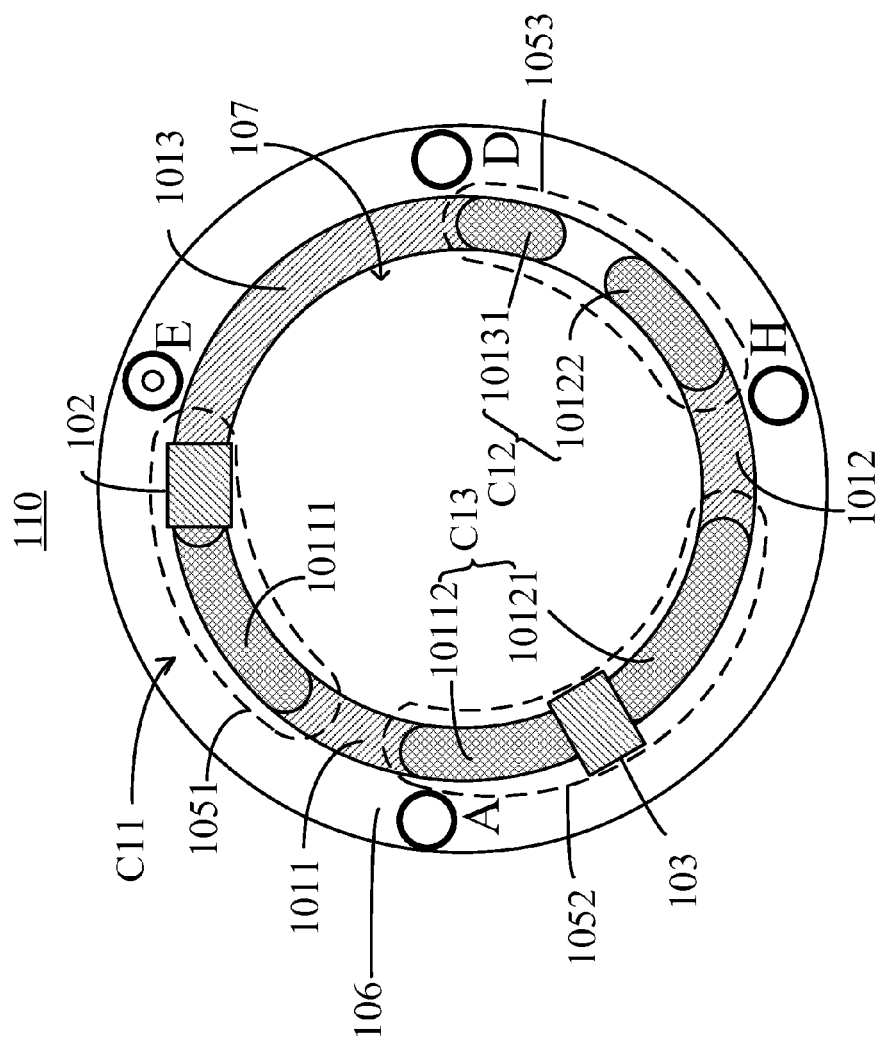
FIG. 7 is a front view of the structure of the active antenna module in FIG. 5.

Please refer to FIG. 7, FIG. 7 is a front view of the structure of the active antenna module in FIG. 5. A first portion 10111 of the first metal microstrip antenna 1011 overlaps the first coupling metal sheet 1051 to form the first capacitor C12. A second portion 10112 of the first metal microstrip antenna 1011 and a first portion 10121 of the second metal microstrip antenna 1012 adjacent to the second portion 10112 of the first metal microstrip antenna 1011 overlap the second coupling metal sheet 1052 to form the third capacitor C13. The first metal microstrip antenna 1011 is approximately in an arc shape, and the first portion 10111 and the second portion 10112 are located at both ends of the arcuate structure. A second portion 10122 of the second metal microstrip antenna 1012 and a first portion 10131 of the third metal microstrip antenna 1013 adjacent to the second portion 10122 of the second metal microstrip antenna 1012 overlap the third coupling metal sheet 1053 to form the second capacitor C13. The second metal microstrip antenna 1012 is approximately in an arc shape, and the first portion 10121 and the second portion 10122 are located at both ends of the arcuate structure. The radio frequency transistor 102 is disposed on the first surface 107. The control port 1023 of the radio frequency transistor 102 is connected to the third metal microstrip antenna 1013.

When designing, the present invention loop antenna 101 must be analyzed through experimental verification. In other words, the present invention active antenna module 110 is transformed into the dual-port circuit shown in FIG. 3. Please also refer to FIG. 7, the circumference of the planar loop antenna 101 is approximately one half of the radio frequency wavelength ($\lambda/2=2\pi r$). Since the diameter measured from the outer margin of the first metal microstrip antenna 1011, the second metal microstrip antenna 1012, and the third metal microstrip antenna 1013 on the front side is 17.1 mm, the frequency should be higher than 2.79 GHz. However, as shown by the structure in FIG. 7, the copper foils on the back side really form equivalent metal coupling capacitors. Hence, the equivalent length of the LC tank is greater than the circumference, which is $17.1\pi$ (mm), to allow the antenna frequency to be reduced to below 2.79 GHz. Furthermore, the phase of the radio frequency transistor 102 is controlled. When the variously electrical phase delays inherently existing between the drain electrode and the gate electrode or the collector electrode and the base electrode of the radio frequency transistor 102 combine with the phase delay of the antenna at its operating frequency to make up the phase delay required by a positive feedback (180°), the optimized oscillation condition is achieved. Thus, as indicated by the experimental test result, the oscillation frequency is 2.3-2.4 GHz when AT41486 transistor is utilized as the oscillator. The oscillation frequency is 2.0-2.1 GHz when BFR92 transistor is utilized as the oscillator. The combinations of metal coupling capacitors and various transistors would therefore reduce the oscillation frequency of the antenna having its original size from 2.79 GHz to 2.0-2.1 GHz. As a result, the antenna size is shrunk to miniaturize the antenna.

It is worth noticing that the stability of the loop antenna 101 will be affected when adjusting the metal coupling capacitors. Take the BJT utilized as the radio frequency transistor 102 as an example, the lower the capacitance value of the equivalent metal coupling capacitor that is used as the first capacitor C11 is, the lower the internal impedance of the radio frequency transistor 102 is to increase the base current $I_B$, based on simple small-signal model equation of BJT. The increased base current $I_B$ will cause the collector current $I_C$ increase. Hence, the spectrum stability of the loop antenna 101 caused by radio frequency oscillation is improved. Furthermore, in the design shown in FIG. 3, the magnitude of the current must be considered when designing the oscillating sensor to ensure good operation. That means, the base current $I_B$, the emitting current $I_E$, and the collector current $I_C$ must be considered when the radio frequency transistor 102 is a BJT. But when the radio frequency transistor 102 is a FET, the gate voltage $V_G$, the source current $I_S$, and the drain current $I_D$ must be considered. For example, special attention should be paid to the design because the emitting current $I_E$ decides the radiation signal strength and consequently affects the sensing range directly. It is understandable that the operating point of the oscillator may be decided by the bias voltage. Theoretical value is very easy to find, but the optimized point must be obtained by experimental verification. The optimized point is found from the conditions having a signal to noise (S/N) ratio higher than the required S/N ratio.

In this structure, the desired equivalent inductance value and the desired equivalent capacitance value are achieved by selecting the first metallic antenna microstrip sheet 1011, the second metallic antenna microstrip sheet 1012, the third metallic antenna microstrip sheet 1013, the first coupling metal sheet 1051, the second coupling metal sheet 1052, and the third coupling metal sheet 1053. As mentioned previously, by designing the lengths of the metal coupling capacitors, the operating frequency of the loop antenna 101 is adjusted toward the lower frequency. In other words, the equivalent length for the half wavelength ($\lambda g/2$) is elongated. In addition, the operating point of the radio frequency transistor 102 is adjusted to compensate the inadequate phase. Finally, the first metallic antenna microstrip sheet 1011, the second metallic antenna microstrip sheet 1012, the third metallic antenna microstrip sheet 1013, the first coupling metal sheet 1051, the second coupling metal sheet 1052, and the third coupling metal sheet 1053 are designed in a manner so that they are used as the resonator when the radio frequency transistor 102 resonates.

Please refer to FIG. 3 and FIG. 4 again, the operating frequency of the present invention loop antenna 101 is decided by the inductance value L of the loop antenna 101 (relevant to the lengths of the first metallic antenna microstrip sheet 1011, the second metallic antenna microstrip sheet 1012, and the third metallic antenna microstrip sheet 1013) and the capacitance value C contributed by the first capacitor C11, the second capacitor C12, and the third capacitor C13 (relevant to the lengths of the first capacitor C11, the second capacitor C12, and the third capacitor C13). The larger the LC value is, the lower the radio frequency oscillation frequency is. Conversely, the smaller the LC value is, the higher the radio frequency oscillation frequency is. However, it is worth noticing that the radio frequency stability is closely related to the selection of the coupling capacitor and the bypass capacitor. When the radio frequency transistor 102 is a BJT, according to the simple small-signal model equation $I_C=\beta I_B$, the smaller the capacitance value of the first capacitor C11, the lower the internal impedance of the radio frequency transistor 102 is to cause the $\beta$ value increase. That means, the collector current $I_C$ is increased to improve the radio frequency stability of the loop antenna 101. When the radio frequency transistor 102 is a FET, the simple small-signal model equation of FET is as follows:

$$I_D = I_{DSS}\left(1 - \frac{V_{GS}}{V_P}\right)^2,$$

where $V_P$ is the pinch-off voltage, $V_{GS}$ is the gate-source voltage, $I_{DSS}$ is the drain-source saturation current. The smaller the capacitance value of the first capacitor C11 is, the lower the internal impedance $r_{DS}$ of the radio frequency transistor 102 is. Since $V_{DS}=r_{DS}\times I_D$, the current $I_D$ is relatively increased under the circumstances of constant input voltage (the drain-source voltage $V_{DS}$ is a constant value).

In summary, in this circuit design, the lower the capacitance values of the first capacitors C11 is, the more stable the radio frequency oscillation is. That is, on the frequency spectrum distribution, the harmonic energy is decreased but the domain energy is increased. Conversely, the higher the capacitance values of the first capacitors C11 is, the less stable the radio frequency oscillation is. That is, on the frequency spectrum distribution, the harmonic energy is increased but the domain energy is decreased. As for the coupling capacitors C12, C13, their effects are just opposite to that of the first capacitor C11. The higher the capacitance values of the coupling capacitors C12, C13 are, the more stable the system is. That is, on the frequency spectrum distribution, the harmonic energy is decreased but the domain energy is increased. Conversely, the lower the capacitance values of the coupling capacitors C12, C13 are, the less stable the system is. That is, on the frequency spectrum distribution, the harmonic energy is increased but the domain energy is decreased.

When the structure of the equivalent model shown in FIG. 4 is compared with a standard radar structure, metal (or copper foil) on the front side and metal (or copper foil) on the back side are equivalent to the loop antenna structure if it is equivalent to a standard radar antenna. In addition, when it is used as a voltage controlled oscillator, the loop antenna and the metal stripes are respectively equivalent to the equivalent inductor (L) and the equivalent capacitor (C), and together constitute the resonant cavity of the transistor. In the present invention active antenna module 100, the radio frequency transistor 102 also has the functions of the voltage controlled oscillator and the mixer. The first metallic antenna microstrip sheet 1011, the second metallic antenna microstrip sheet 1012, the third metallic antenna microstrip sheet 1013, the first coupling metal sheet 1051, the second coupling metal sheet 1052, and the third coupling metal sheet 1053 are designed in a manner so that they are used as the resonator when the radio frequency transistor 102 resonates. When it is used as the mixer, the bias voltage applied to the base is utilized for driving the radio frequency transistor 102 to operate near the saturation region so as to detect the intermediate frequency signal at the emitter.

Please refer to FIG. 4, since the radio frequency transistor 102 of the active antenna module 110 functions as the mixer, the radio frequency transistor 102 and the first low pass filter 120 may act as the first demodulator 140*a* to down convert and demodulate the first FMCW signal and the second FMCW signal for the first time so as to obtain the beat signal. That means, when the second port 1022 of the radio frequency transistor 102 serves as the transmitting terminal 101T for the first FMCW signal (with a frequency $f_t$) and the control port 1023 serves as the receiving terminal 101R for the second FMCW signal (with a frequency $f_r$) reflected back from the object, the first port 1021 outputs the beat signal. The frequency of the beat signal $f_b$ ($=f_t-f_r$) can be utilized for calculating and obtaining the range between the microwave sensor 100 and the object. The method is elaborated in detail as follows.

Figure 8:
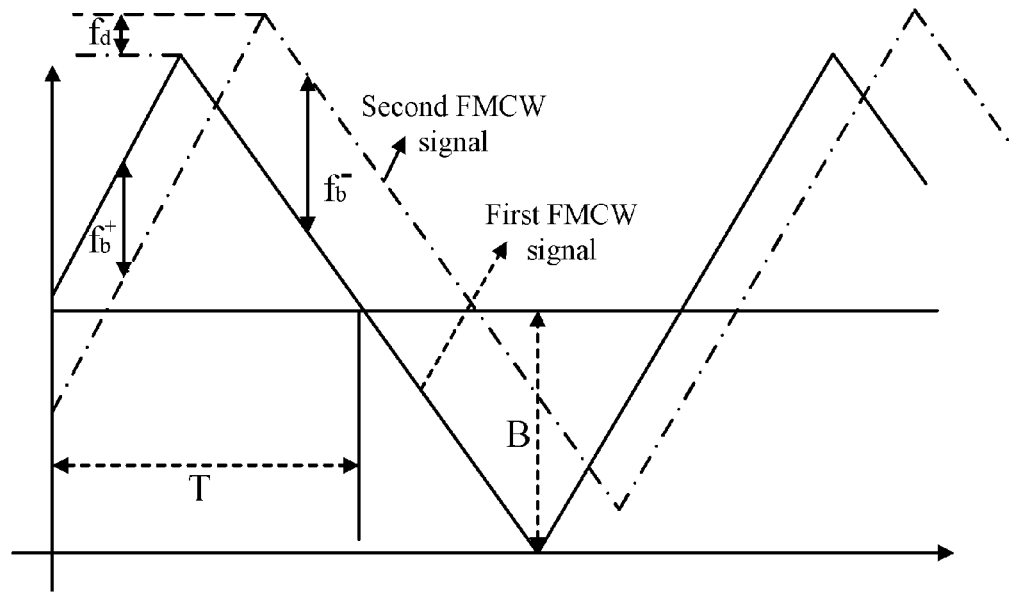
FIG. 8 is a plot of the frequency of the first FMCW signal transmitted from the microwave sensor and the frequency of the second FMCW signal received by the microwave sensor versus time according to the present invention.

Please refer to FIG. 8, FIG. 8 is a plot of the frequency of the first FMCW signal transmitted from the microwave sensor 100 and the frequency of the second FMCW signal received by the microwave sensor 100 versus time according to the present invention. The up-sweep beat frequency $f_b^+$ and the down-sweep beat frequency $f_b^-$ represent the differences between the frequencies of the first FMCW signal and the second FMCW signal when sweeping upward and downward, respectively. When there is no relative movement between the object and the microwave sensor 100, $f_b=f_b^+=f_b^-$. When the object moves towards the microwave sensor 100, $f_b^+=f_b-f_d$, $f_b^-=f_b+f_d$, and $f_d$ represents the frequency of the Doppler signal. When the object moves away from the microwave sensor 100, $f_b^-=f_b-f_d$, $f_b^+=f_b+f_d$. Hence, $f_b=(f_b^-+f_b^+)/2$.

Figure 9:
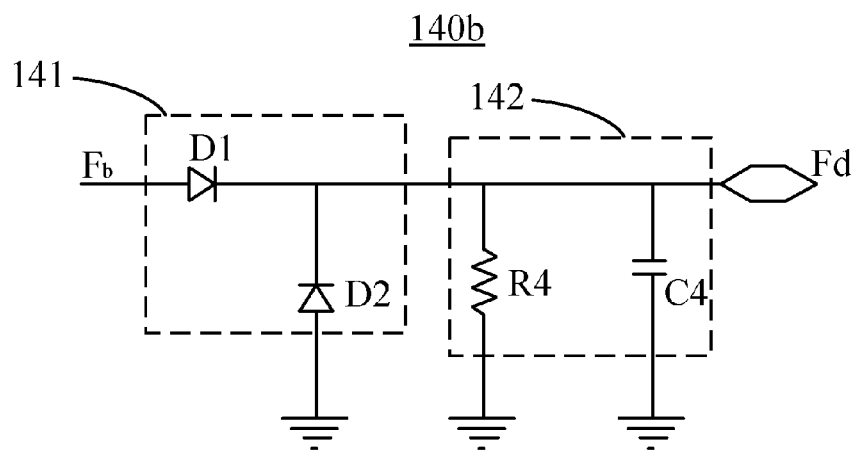
FIG. 9 is a circuit diagram of the second demodulator.

Please refer to FIG. 9, FIG. 9 is a circuit diagram of the second demodulator 140b. The second demodulator 140b comprises an AM peak envelope sensor 141 and a second low pass filter 142. The AM peak envelope sensor 141, being electrically connected to the first port 121 of the radio frequency transistor 102, comprises diodes D1 and D2. A positive terminal of the diode D1 is coupled to the first port 121 of the radio frequency transistor 102. A negative terminal of the diode D1 is coupled to the second low pass filter 142. A positive terminal of the diode D2 is coupled to the ground terminal. A negative terminal of the diode D2 is coupled to the second low pass filter 142. The AM peak envelope sensor 141 is utilized for extracting two signals having frequencies of $f_b^-+f_b^+$ and $f_b^--f_b^+$ from the beat signal $f_b$ according to the AM peak envelope detection. The Doppler signal is then obtained by utilizing the second low pass filter 142, and the Doppler signal has the frequency of $f_d=|f_b^--f_b^+|$.

The discrimination control module 160 comprises a range calculation unit 161, a velocity calculation unit 162, a discrimination circuit 163, and a level control unit 164. The range calculation unit 161 is utilized for calculating the range between the microwave sensor 100 and the object based on the beat signal $f_b$. The level control unit 164 is utilized for adjusting the sweep bandwidth B of the first FMCW signal. The discrimination circuit 163 is utilized for determining whether to transmit the trigger signal to the enabling unit 170 based on an intensity of the second FMCW signal and the moving velocity of the object. When the intensity of the second FMCW signal reflected back from the object is below a predetermined intensity, the discrimination circuit 163 will ignore the calculation results of the object. When the intensity of the second FMCW signal reflected back from the object is higher than a default intensity, the discrimination circuit 163 will generate the trigger signal based on the moving velocity of the object.

The sweep bandwidth B (that is the bandwidth of the first FMCW signal) and the sweep period T are known, and they are in direct proportion to each other. As a result, the round trip time Δt which is the time difference between the first FMCW signal transmitted from the active antenna module 110 and the second FMCW signal reflected by the object and received by the active antenna module 110 can be represented by the following equation (1):

$$\Delta t = f_b \times T/B \qquad (1)$$

where $f_b$ is the frequency of the beat signal, B is the sweep bandwidth, and T is the sweep period.

Since the FMCW signal is electromagnetic wave and it travels twice the range R within the round trip time Δt, therefore 2R=c×Δt (c is speed of light). The round trip time Δt of the FMCW signal is then substituted into the equation to obtain the range R represented by the following equation (2):

$$R = (f_b \times c \times T)/(2 \times B) \qquad (2)$$

The velocity calculation unit 162 is utilized for calculating the moving speed v of the object based on the Doppler signal. Since the frequency of the Doppler signal $f_d=f_b^--f_b^+=(2\times f_c \times v \times \cos\theta)/c$ and $f_c$ is the center frequency of the carrier, the moving velocity of the object $v=(f_b^--f_b^+)\times c/(2\times f_c \times \cos\theta)$.

Figure 10:
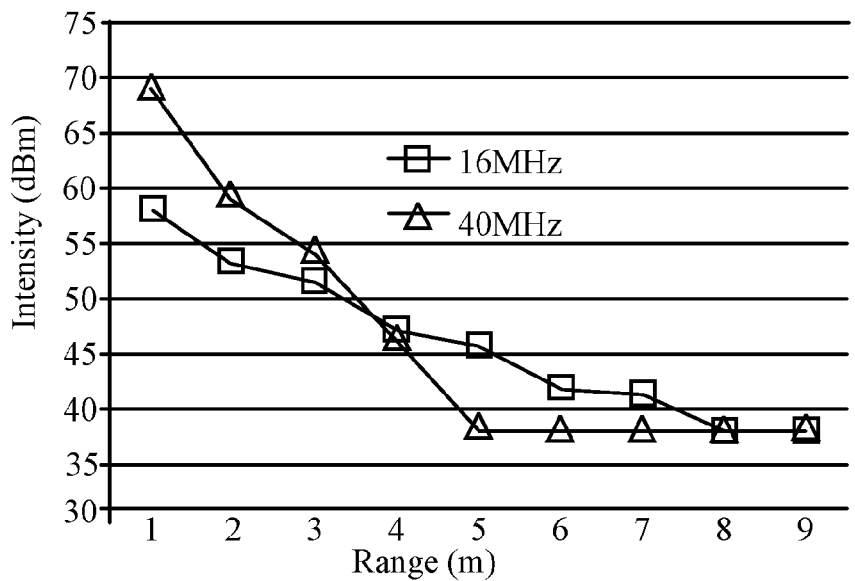
FIG. 10 is a plot of the sweep bandwidth versus range.

Please refer to FIG. 10, FIG. 10 is a plot of the sweep bandwidth versus range. In FIG. 10, the operation voltage is 12V, the first FMCW signals having sweep bandwidths of 16 MHz and 40 MHz were transmitted towards the objects having different ranges. It is observed that under the circumstances of 40 MHz sweep bandwidth, all of the energy is concentrated within four meters and attenuates suddenly after four meters, whereas under the circumstances of 16 MHz sweep bandwidth, the energy is more evenly distributed within seven meters. Hence, the larger the sweep bandwidth B (equal to the radio frequency bandwidth of the first FMCW signal Δf) is, the shorter the detection range of the microwave sensor 100 is. Conversely, the smaller the sweep bandwidth B is, the longer the detection range of the microwave sensor 100 is.

Please refer to FIG. 3, FIG. 8, and FIG. 10, the modulation module 130 comprises a modulation signal generator 131 and a level amplification control unit 132. The modulation signal generator 131 is utilized for generating the modulation signal. More preferably, the modulation signal is a triangular wave. The level amplification control unit 132 is utilized for controlling the level of the modulation signal based on a level-adjusting signal generated by the level control unit 164. The radio frequency bandwidth of the first FMCW signal Δf will be directly affected by the amplitude of the modulation signal generated by the modulation signal generator 131. The larger the amplitude of the modulation signal is, the larger the radio frequency bandwidth Δf is. Conversely, the smaller the amplitude of the modulation signal is, the smaller the radio frequency bandwidth Δf is. As a result, the radio frequency bandwidth of the first FMCW signal Δf is reduced when the detection range is enlarged. Conversely, the radio frequency bandwidth of the first FMCW signal Δf is enlarged when the detection range is reduced.

According to the embodiment of the present invention, the microwave sensor 100 sets a plurality of stages of range gates (i.e. detection ranges). Each of the stages of the range gate is corresponding to one of the frequency bandwidths Δf of a FMCW signal, and each of the frequency bandwidths Δf of the FMCW signal is corresponding to one of the amplitudes of the modulation signal. If the range gate of the microwave sensor 100 is set as 4 meter, the modulation signal generator 131 will generate the corresponding triangular signal, that is the first FMCW signals having the bandwidth of 40 MHz. The energy of the second FMCW signal reflected back from the object having its range more than four meters is substantially attenuated when compared with that reflected back from the object having its range less than four meters. The discrimination circuit 163 of the discrimination control module 160 therefore ignores the second FMCW signal reflected back from the object having its range more than four meters. By doing so, the present invention microwave sensor 100 controls the amplitude of the modulation signal generated by the modulation signal generator 131 to set the plurality of stages of the range gates. Each of the stages of the range gates is corresponding to one detection range. Only the object within the set detection range is detected. Hence, the present invention sets each of the detection ranges expressly.

Figure 11:
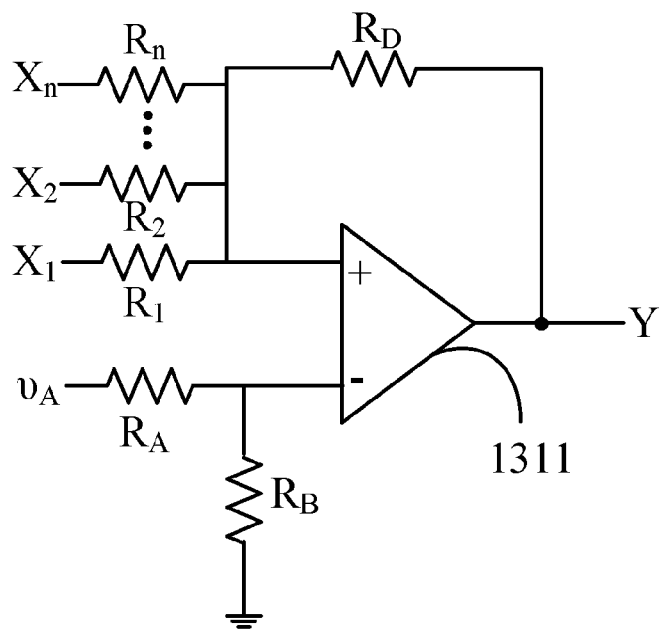
FIG. 11 shows a circuit diagram of the modulation signal generator according to an embodiment of the present invention.

Referring to FIG. 11 showing a circuit diagram of the modulation signal generator 131 according to an embodiment of the present invention, the modulation signal generator 131 may synthesize the triangular signal with the digital to analog interface of a digital signal processor, and the digital signal processor controls the magnitude of the amplitude by itself. The modulation signal generator 131 may also be the triangular wave generator of the analog circuit, as shown in FIG. 10. The modulation signal generator 131 may be an adder using an operational amplifier 1311 which comprises a plurality of input terminals $X_1, X_2, \ldots, X_n$ and an output terminal Y. Each of the resistors $R_1, R_2, \ldots, R_n$ is coupled between the corresponding input terminal in the input terminals $X_1$, $X_2, \ldots, X_n$ and the positive input terminal of the operational amplifier 1311. By grounding one of the input terminals $X_1$, $X_2, \ldots, X_n$ and floating the other input terminals, the output terminal Y will output the triangular modulation signal having varied amplitude.

Figure 12:
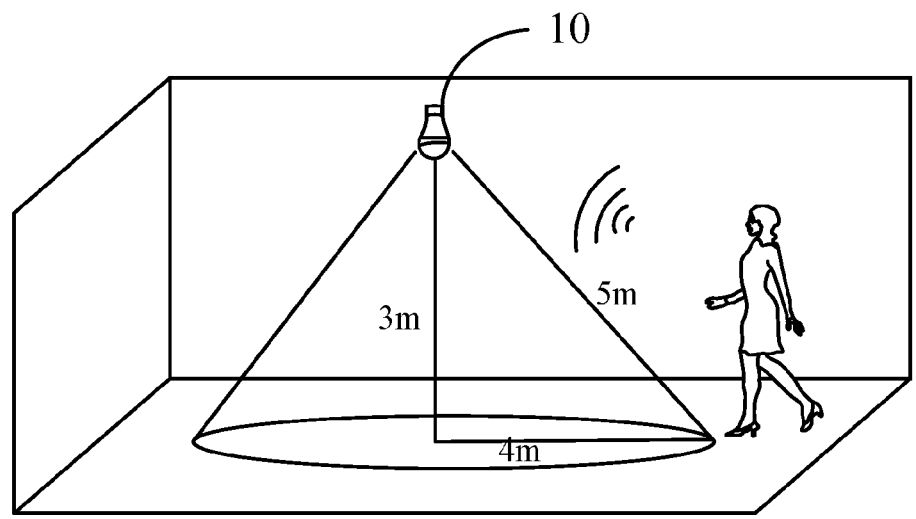
FIG. 12 illustrates the lighting device used in indoor space according to the present invention.

Please refer FIGS. 2, 3, and 12. FIG. 12 illustrates the lighting device 10 used in indoor space according to the present invention. The lighting device 10 can adjust the range gate of the microwave sensor 100 according to the size of the indoor space; in other words, the lighting device 10 can change the amplitude of the modulation signal generated by the modulation signal generator 131. When the target (e.g., a person) enters the range of the range gate, the differential circuit 163 determines whether to generate the trigger signal or not according to the velocity and range of the target. The enabling unit 24 conducts when receiving the trigger signal. Then the power module 20 provides the converted direct power to the light source 12 for controlling the operation of the light source 12 such as emitting light.

Figure 13:
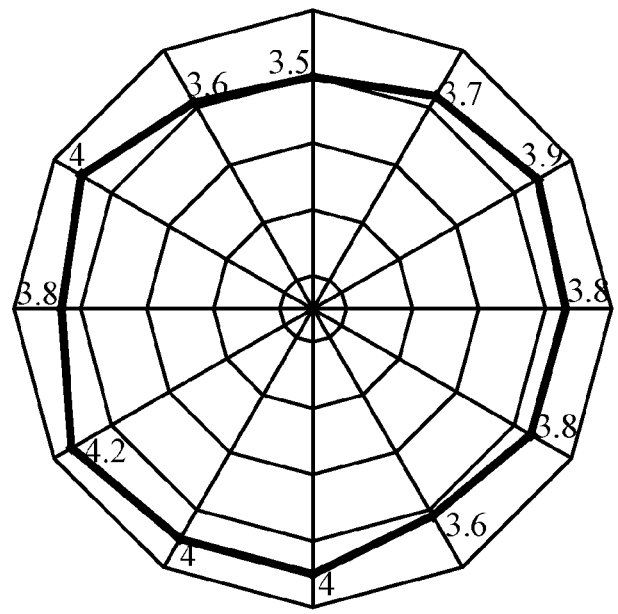
FIG. 13 illustrating that the lighting device hangs with a ceiling height of three meters.

Please refer to FIG. 13 illustrating that the lighting device 10 hangs with a ceiling height of three meters. The range gate of the radiation field is set as five meters. The center of the radiation field shown in FIG. 13 is right below the light source 12. The RF transistor 102 on the microwave sensor 100 is set as zero degree, which is the base. When the target enters in any direction, the range between the target and the center is recorded while the light source 12 is activated. For example, when the target enters from the right side and is away from 3.8 meters, the lighting device 10 emits light. The radiation field of the microwave sensor 100 is almost omnidirectional in FIG. 13.

The microwave sensor 100 of the lighting device 10 integrates the oscillator of the RF module, the mixture tube, and the antenna into one entity, which means that the microwave sensor 100 is simplified and downsized. In this way, the microwave sensor 100, the light source 12, and the power module 20 can be integrated into the lamp body. The microwave sensor 100 and the light source 12 can use ordinary alternative power without other external control circuits and wires. In this way, it is unnecessary to use a domestic layout and a control circuit of a lamp.

In addition, the higher the frequency of the conventional infrared sensor and the conventional 2.4 GHz microwave sensor which sense a radiator during a frequency band of microwave and light wave, the narrower the 3 dB beam-width of a radiation pattern. A side-lobe may be generated at certain angles, resulting in a blind angle of measurement if an omnidirectional field pattern is achieved in a design of array or antenna adjustment. Compared with the conventional infrared sensor and the conventional 2.4 GHz microwave sensor, the radiation field of the microwave sensor 100 used in the lighting device in the present invention is almost omnidirectional without a blind angle in measurement. With the microwave sensor 100, the lighting device of the present invention can sense the target in a short distance but at a large angle.

The first demodulator of the microwave sensor 100 equipped with the transistor and the low pass filter replaces the mixture tube. At the first stage, the first demodulator of the microwave sensor 100 lowers and demodulates frequency for obtaining information on the calculated range. At the second stage, the second demodulator of the microwave sensor 100 lowers and demodulates frequency for obtaining information on the calculated velocity. The microwave sensor 100 of the present invention directly and quickly calculates the range and velocity and obtains the information on the calculated the range and velocity from the circuit hardware, so the design of the digital signal processor of the conventional microwave sensor can be greatly simplified. Moreover, the amplitude of the modulation signal generated by the modulation signal generator is altered to adjust the RF bandwidth of the FMCW signals for controlling different detection ranges. A plurality of detection ranges are set in the present invention. The target is sensed only in the set detection ranges, so each of the set detection ranges is obviously defined.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A lighting device, comprising:
   a light source, for generating light;
   a microwave sensor, comprising:
   an active antenna module, for transmitting a first frequency modulation continuous wave (FMCW) signal toward a target with a sweep period and for receiving a second FMCW signal reflected from the target, the active antenna module comprising:
   a loop antenna comprising a transmitting terminal and a receiving terminal, wherein the transmitting terminal is configured to transmit the first FMCW signal, and the receiving terminal is configured to transmit the second FMCW signal; and
   a radio frequency (RF) transistor, comprising a control port, a first port and a second port, the second port coupled to the transmitting terminal, the control port coupled to the receiving terminal, and the control port being the reverse of the second port;
   a modulation module, electrically connected to the active antenna module and used for generating a modulation signal provided to the active antenna module according to a range gate chosen from a plurality of range gates, a bandwidth of the first FMCW signal being modulated according to amplitude of the modulation signal, and the plurality of range gates bi-uniquely corresponding to bandwidths of a plurality of first FMCW signals;
   a first low pass filter, electrically connected to the first port of the RF transistor, the first low pass filter and the RF transistor forming a first demodulator, wherein the first demodulator is configured to demodulate a beat frequency signal based on a range gate, and the beat frequency signal comprising a frequency difference of the first FMCW signal and the second FMCW signal; and
   a second demodulator, electrically connected to the first demodulator, for demodulating the beat frequency signal for generating the Doppler signal, the frequency of the Doppler signal being equal to a frequency difference of an up-sweep beat frequency and a down-sweep beat frequency; and
   a discrimination control module, electrically connected to the modulation module, for calculating a range between the microwave sensor and the target based on the beat frequency signal generated after the first FMCW signal and the second FMCW signal are demodulated when the object is located within the range gate, for calculating velocity of the target according to a frequency of the Doppler signal, and for determining whether to generate a triggering signal or not according to the calculated velocity and the calculated range; and a power module, electrically connected between the microwave sensor and the light source for enabling a lamp based on the triggering signal.

2. The lighting device as claimed in claim 1, wherein the second demodulator comprises:
an AM Peak envelope sensor, electrically connected to the first low pass filter; and
a second low pass filter, electrically connected to the AM Peak envelope sensor, and used for outputting the Doppler signal.

3. The lighting device as claimed in claim 1, wherein the RF transistor is a bipolar junction transistor (BJT), the control port is a base, the first port is an emitter, and the second port is a collector.

4. The lighting device as claimed in claim 1, wherein the radio frequency transistor is a field effect transistor, the field effect transistor comprises a pseudo high electron mobility transistor, the control port is a gate, the first port is a source, and the second port is a drain.

5. The lighting device as claimed in claim 1, wherein the microwave sensor further comprises a first capacitor, two ends of the first capacitor are connected to the first port and the second port of the radio frequency transistor, and the loop antenna comprises:
a first inductor coupled to the second port of the radio frequency transistor;
a second inductor;
a third inductor coupled to the control port of the radio frequency transistor;
a second capacitor coupled between the first inductor and the second inductor; and
a third capacitor coupled between the second indictor and the third inductor.

6. The lighting device as claimed in claim 1, wherein the discrimination control module comprises a range calculation unit electrically connected to the first port of the RF transistor and used for calculating a range between the microwave sensor and the target according to a first relation, the first relation is R=($f_b$×c×T)/(2×B), R indicates the range between the microwave sensor and the target, $f_b$ indicates beat frequency signal, B indicates scanning bandwidth, c indicates speed of light, and T indicates sweep period.

7. The lighting device as claimed in claim 1, wherein the active antenna module comprises a substrate comprising a first surface and a second surface, and the first surface is opposite to the second surface;
a first metallic antenna microstrip, disposed on the first surface of the substrate;
a second metallic antenna microstrip, disposed on the first surface of the substrate;
a third metallic antenna microstrip, disposed on the first surface of the substrate;
a first coupling metallic sheet, disposed on the second surface of the substrate;
a second coupling metallic sheet, disposed on the second surface; and
a third coupling metallic sheet, disposed on the second surface;
the RF transistor, disposed on the first surface, the control port of the RF transistor connected to the third metallic antenna microstrip, and the first port and the second port being connected to the first coupling metallic sheet and the first metallic antenna microstrip, respectively;
a first portion of the first metallic antenna microstrip and the first coupling metallic sheet forming a first capacitor, a second portion of the first metallic antenna microstrip, a first portion of the second metallic antenna microstrip adjoining the first portion of the first metallic antenna microstrip, and the second coupling metallic sheet forming a third capacitor, and a second portion of the second metallic antenna microstrip, a second portion of the third metallic antenna microstrip adjoining the second portion of the second metallic antenna microstrip, and the third coupling metallic sheet forming a third capacitor.

8. The lighting device as claimed in claim 1, wherein the active antenna module transmits the first FMCW signal, a direction of the first FMCW signal forms an angle with a moving direction of the target, and the discrimination control module is used for calculating the velocity of the moving target according to the angle, the speed of light, and the center frequency of a carrier wave of the first FMCW signal.

9. The lighting device as claimed in claim 8, wherein the discrimination control module comprises a velocity calculation unit used for calculating the velocity of the moving target according to a second relation, the second relation is v=($f_b^-$−$f_b^+$)×c/(2×$f_c$×cos θ), v indicates velocity of the moving target, $f_b^-$ indicates down-sweep beat frequency, $f_b^+$ indicates up-sweep beat frequency, c indicates speed of light, and $f_c$ indicates center frequency of the carrier wave.

10. The lighting device as claimed in claim 1, wherein the modulation module comprises a digital to analog interface of a digital signal processor and the digital to analog interface of the digital signal processor synthesizes the modulation signal.

11. The lighting device as claimed in claim 1, wherein the modulation module comprises an adder having an operational amplifier, the adder comprises a plurality of input terminals and an output terminal, each of the plurality of input terminals and an input positive terminal of the operational amplifier are coupled to different resistors, when one input terminal is connected to ground, the other input terminals are floating for outputting the different modulation signals with different amplitudes.

12. The lighting device as claimed in claim 1, wherein the lighting device also comprises a lamp body, and the microwave sensor, the light source, and the power module are accommodated in the lamp body.

* * * * *